United States Patent
Cho et al.

(10) Patent No.: US 10,345,628 B2
(45) Date of Patent: Jul. 9, 2019

(54) DISPLAY APPARATUS AND METHOD FOR CONTROLLING TEMPERATURE IN DISPLAY APPARATUS THEREOF

(71) Applicant: SAMSUNG ELECTRONICS CO., LTD., Suwon-si (KR)

(72) Inventors: Yun-seong Cho, Suwon-si (KR); Sung-ho Lee, Hwaseong-si (KR); Woong-jae Song, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 14/808,356

(22) Filed: Jul. 24, 2015

(65) Prior Publication Data

US 2016/0026012 A1    Jan. 28, 2016

(30) Foreign Application Priority Data

Jul. 25, 2014    (KR) .......................... 10-2014-0094628

(51) Int. Cl.
*G02F 1/01* (2006.01)
*G02F 1/00* (2006.01)
(Continued)

(52) U.S. Cl.
CPC ............ *G02F 1/0147* (2013.01); *G02F 1/009* (2013.01); *G02F 1/0121* (2013.01);
(Continued)

(58) Field of Classification Search
CPC ...... G02F 1/0147; G02F 1/009; G02F 1/0121; G09G 3/3225; G09G 3/2022;
(Continued)

(56) References Cited

U.S. PATENT DOCUMENTS

| 9,378,689 B2 | 6/2016 | Ahn | |
|---|---|---|---|
| 2001/0026625 A1* | 10/2001 | Azima | H04R 7/045 381/152 |

(Continued)

FOREIGN PATENT DOCUMENTS

| CN | 1797104 A | 7/2006 |
|---|---|---|
| CN | 101614900 A | 12/2009 |

(Continued)

OTHER PUBLICATIONS

Written Opinion dated Nov. 19, 2015, issued by International Searching Authority in International Application No. PCT/KR2015/007746 ( PCT/ISA/237).

(Continued)

*Primary Examiner* — Sejoon Ahn
(74) *Attorney, Agent, or Firm* — Sughrue Mion, PLLC

(57) ABSTRACT

A display apparatus and a method for controlling the display apparatus are provided. The display apparatus includes a display panel unit, a reflector disposed on the display panel unit, a radiator, an illumination sensing unit, and a controller. A color of the reflector is changeable according to a temperature thereof, and the reflector is positioned to reflect light incident on the reflector from outside the display apparatus. The heat radiator generates heat to control the temperature of the reflector, and the illumination sensing unit senses an illumination value of light incident on the display apparatus from outside. The controller controls the heat radiator to change the temperature of the reflector according to the illumination value sensed by the illumination sensing unit.

18 Claims, 14 Drawing Sheets

(51) Int. Cl.
*G02F 1/19* (2019.01)
*G02F 1/23* (2006.01)
*G02F 1/1335* (2006.01)

(52) U.S. Cl.
CPC .. *G02F 1/133524* (2013.01); *G02F 1/133526* (2013.01); *G02F 1/19* (2013.01); *G02F 1/23* (2013.01); *G02F 2001/133562* (2013.01)

(58) Field of Classification Search
CPC ............... G09G 3/3233; G09G 3/3266; G09G 2300/0426; G09G 2300/0819; G09G 2300/0842; G09G 2310/08
See application file for complete search history.

(56) References Cited

U.S. PATENT DOCUMENTS

| | | | | |
|---|---|---|---|---|
| 2001/0040659 | A1* | 11/2001 | Hanoka | G02F 1/133371 349/113 |
| 2005/0190987 | A1* | 9/2005 | Schulz | G02B 5/005 382/291 |
| 2007/0201712 | A1* | 8/2007 | Saiki | H04R 1/2834 381/186 |
| 2007/0285775 | A1* | 12/2007 | Lesage | G02F 1/0147 359/465 |
| 2008/0055724 | A1* | 3/2008 | Bluem | G02B 5/3008 359/487.06 |
| 2010/0253675 | A1* | 10/2010 | Furukawa | G09G 3/3648 345/214 |
| 2011/0001697 | A1 | 1/2011 | Mao | |
| 2012/0044278 | A1* | 2/2012 | Hwang | H04M 1/0266 345/690 |
| 2014/0022287 | A1 | 1/2014 | Ahn | |
| 2014/0184577 | A1* | 7/2014 | Kim | G09G 5/10 345/207 |
| 2015/0316230 | A1* | 11/2015 | Harbers | F21V 7/10 362/277 |

FOREIGN PATENT DOCUMENTS

| | | |
|---|---|---|
| CN | 101650923 A | 2/2010 |
| CN | 102439513 A | 5/2012 |
| EP | 2426548 A1 | 3/2012 |
| JP | 2010-97157 A | 4/2010 |
| KR | 10-2012-0052019 A | 5/2012 |
| KR | 10-2012-0112889 A | 10/2012 |
| KR | 20-2013-0001694 U | 3/2013 |

OTHER PUBLICATIONS

International Search Report dated Nov. 19, 2015, issued by International Searching Authority in corresponding International Application No. PCT/KR2015/007746 (PCT/ISA/210).

Communication dated Jan. 26, 2017 issued by the State Intellectual Property Office of P.R. China in counterpart Chinese Patent Application No. 201510438750.1.

Communication dated Feb. 21, 2018, issued by the European Patent Office in counterpart European Application No. 15825217.1.

* cited by examiner

DISPLAY APPARATUS AND METHOD FOR CONTROLLING TEMPERATURE IN DISPLAY APPARATUS THEREOF

CROSS-REFERENCE TO RELATED APPLICATION

This application claims priority from Korean Patent Application No. 10-2014-0094628, filed on Jul. 25, 2014, in the Korean Intellectual Property Office, the disclosure of which is incorporated herein by reference in its entirety.

BACKGROUND

1. Field

Methods and apparatuses consistent with exemplary embodiments relate to a display apparatus capable of reflecting light, received from outside the display apparatus, using a reflector positioned on a display panel, and a method for controlling the display apparatus.

2. Description of the Related Art

Currently, any number of various types of multimedia contents and information can be received by and displayed on a display apparatus, regardless of the time and location of the display apparatus.

In the case of a conventional display apparatus, a viewer may not be able to properly watch an image content output by the display apparatus due to external light. Particularly in the case of a display apparatus located outside, viewing may be especially difficult due to bright sunlight.

Accordingly, a method for displaying image content on a display apparatus, so that the content can be easily viewed regardless of external light, is desired.

SUMMARY

One or more exemplary embodiments may address the aforementioned problems by providing a display apparatus that is capable of preventing a blackening phenomenon by reflecting light based on a determined illumination value of external light, and a method for controlling the display apparatus.

According to an aspect of an exemplary embodiment, a display apparatus includes a display panel unit, a reflector disposed on the display panel unit, a heat radiator disposed on the reflector, an illumination sensing unit configured to sense an illumination value of light incident on the display apparatus from outside, and a controller configured to control the heat radiator. A color of the reflector is changeable according to a temperature thereof, and the controller controls the heat radiator to change a temperature of the reflector according to the illumination value sensed by the illumination sensing unit.

The reflector is positioned to reflect light incident on the display apparatus from outside the display apparatus, and a temperature indicating paint may be disposed on the reflector. A color of the temperature indicating paint is changeable according to a temperature thereof, to thereby reflect the light incident thereon.

The temperature indicating paint may be applied one or more sides of the reflector which face a direction from which light is incident on the display apparatus from outside the display apparatus.

In response to an illumination value sensed by the illumination sensing unit being equal to or higher than a predetermined value, the controller may control the heat radiator to generate heat in order to change a color of the temperature indicating paint of the reflector so that the reflector reflects light incident thereon.

The illumination sensing unit may include a plurality of illumination sensors, and the plurality of illumination sensors may sense illumination values in a plurality of areas of the display panel unit.

The controller may control the heat radiator so that heat is generated in an area of the reflector corresponding to an area in which the illumination value is equal to or higher than a predetermined value, among a plurality of illumination values sensed by the plurality of illumination sensors.

The controller may determine an installation height of the display apparatus, and control the heat radiator to generate heat in only one of a plurality of areas of the display apparatus according to the determined installation height.

The display apparatus further includes a distance sensing unit configured to measure a distance between the display apparatus and a viewer, and the controller may control the heat radiator so that heat is generated in only one of a plurality of areas of the display apparatus according to a distance between the display apparatus and the viewer, measured by the distance sensing unit, and an installation height of the display apparatus.

The heat radiator may include at least one of transparent indium tin oxide (ITO) and a graphene heater film.

According to an aspect of another exemplary embodiment, a method is provided for controlling a display apparatus. The display apparatus comprises a display panel unit, a reflector disposed on the display panel unit. A color of the reflector is changeable according to a temperature thereof, and the reflector is oriented to reflect light incident on the display apparatus from outside the display apparatus. The method may include sensing an illumination value of light incident on the display apparatus from outside, and generating heat to control a temperature of the reflector, in order to reflect light incident thereon from the outside, based on the sensed illumination value.

The reflector may reflect light using a temperature indicating paint having a color that is changeable according to a temperature thereof.

The reflector may have a predetermined shape, and the temperature indicating paint may be applied to at least one side of the reflector which faces a direction from which light is incident on the display apparatus from outside the display apparatus.

The generating heat may comprise generate heat in order to change a color of the temperature indicating paint of the reflector so that the reflector reflects light incident thereon from the outside when an illumination value sensed by the illumination sensing unit is equal to or higher than a predetermined value.

The sensing may comprising sensing an illumination value in each of a plurality of areas of the display panel unit using a plurality of illumination sensors.

The generating heat may comprise generating heat in only one area in which an illumination value is equal to or higher than a predetermined value, among a plurality of areas of the display apparatus.

The method may further include determining an installation height of the display apparatus, and the generating heat may comprise generating heat in only one of a plurality of areas of the display apparatus according to the determined installation height.

One or more of the exemplary embodiments described above may enable a user to easily view image content, output from a display apparatus, regardless of external light.

DETAILED DESCRIPTION OF EXEMPLARY EMBODIMENTS

Figure 1:
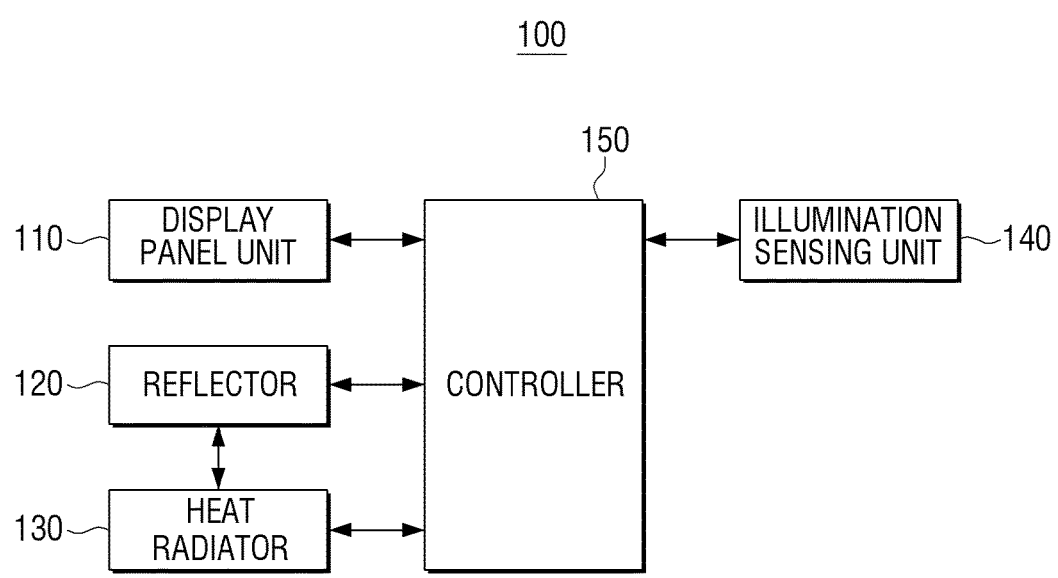
FIG. 1. is a block diagram illustrating a configuration of a display apparatus according to an exemplary embodiment.

In the following description, the same drawing reference numerals are used for the same elements among different drawings. The specifics described below, such as detailed construction and elements, are provided to assist in a comprehensive understanding of exemplary embodiments. The exemplary embodiments can be carried out without these specifically defined matters, as would be understood by one of skill in the art. Also, well-known functions or constructions are not described in detail as such descriptions might would obscure the exemplary embodiments with unnecessary detail.

Although the terms first, second, etc. may be used herein to describe various elements, these elements should not be interpreted as being limited by these terms. These terms are only used to distinguish one element from another element.

The terminology used herein is for the purpose of describing particular embodiments only and is not intended to be limiting of exemplary embodiments. As used herein, the singular forms "a," "an" and "the" are intended to include the plural forms as well, unless context clearly indicates otherwise. It should be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups.

In exemplary embodiments described below, a "module" or a "unit" may perform at least one function or operation and may be embodied by hardware or software or by a combination of hardware and software. Also, a plurality of "modules" or a plurality of "units" may be integrated into at least one module or units, and a "module" or a "unit" embodied as particular hardware may be embodied by at least one processor.

Hereinafter, exemplary embodiments will be described in greater detail with reference to the accompanying drawings. FIG. 1 is a block diagram illustrating a configuration of a display apparatus 100 according to an exemplary embodiment. As illustrated in FIG. 1, the display apparatus 100 includes a display panel unit 110, a reflector 120, a heat radiator 130, an illumination sensing unit 140, and a controller 150. For example, the display apparatus 100 may be a kiosk installed outside a building, or may be embodied by any of various display apparatuses such as a digital television (TV), a desktop personal computer (PC), a notebook PC, a navigation unit, a smart TV, a digital information display (DID), or the like.

The controller 150 controls the display panel unit 110 to display image data.

The reflector 120 is disposed on the display panel unit 110, and a color of the reflector 120 changes according to temperature. The reflector 120 reflects light incident thereon from outside of the display apparatus 100. In particular, the reflector 120 may reflect incident light using a temperature indicating paint that has a color that changes according to temperature.

The heat radiator 130 is disposed on the reflector 120 and is controlled by the controller 150 to generate heat and thereby control the temperature of the reflector 120. In this way, the heat radiator 130 generates heat that heats the reflector 120, causing the reflector to change color.

The illumination sensing unit 140 senses light incident from outside the display apparatus 100. In particular, the illumination sensing unit 140 may be equipped with a plurality of illumination sensors corresponding to a plurality of areas of the display panel unit 110.

The controller 150 controls the overall operation of the display apparatus 100. In particular, the controller 150 may control the heat radiator 130 to generate heat to control the temperature of the reflector 120, based on to an illumination value sensed by the illumination sensing unit 140. Specifically, if an illumination value sensed through the illumination sensing unit 140 is equal to or higher than a predetermined value, the controller 150 may control the heat generator 130 to generate heat to cause the color of the temperature indicating paint of the reflector 120 to change color, thereby controlling the reflector 120 to reflect light incident from outside the display apparatus 100.

If the illumination sensing unit 140 includes a plurality of illumination sensors, the controller 150 may sense illumination values of a plurality of areas of the display panel unit 110 using the plurality of illumination sensors. The controller 150 may then control a portion of the heat radiator 130, positioned in the area where an illumination value is equal to or higher than a predetermined value, to generate heat, thereby heating a portion of the reflector 120, positioned in the area of the display panel unit 110 where the illumination value is equal to or higher than the predetermined value, reflects light incident thereon from outside the display apparatus 100.

The controller 150 may determine an installation height of the display panel unit 110 and generate heat in only a portion of the display panel unit 110 according to the determined installation height. More specifically, assuming that the display panel unit 110 is mounted vertically, if a viewer is viewing an image, displayed on an area of the display panel unit 110 where temperature indicating paint is applied, from an angle greater than an angle (θ), below the horizon, the discoloration of the temperature indicating paint may block the image from the viewer. In this situation, the controller 150 may control the heat radiator 130 to heat the reflector such that the reflector only reflects light from areas of the display panel unit 110 that are higher than a predetermined height.

The controller 150 may control the heat radiator 120 to generate heat in only a partial region of the display panel unit 110 based on a distance between the display apparatus 100 and a viewer and on an installation height of the display apparatus 100.

According to the various exemplary embodiments described above, a viewer outside a building may more easily view an image displayed on the display apparatus 100 regardless of ambient light.

Figure 2:
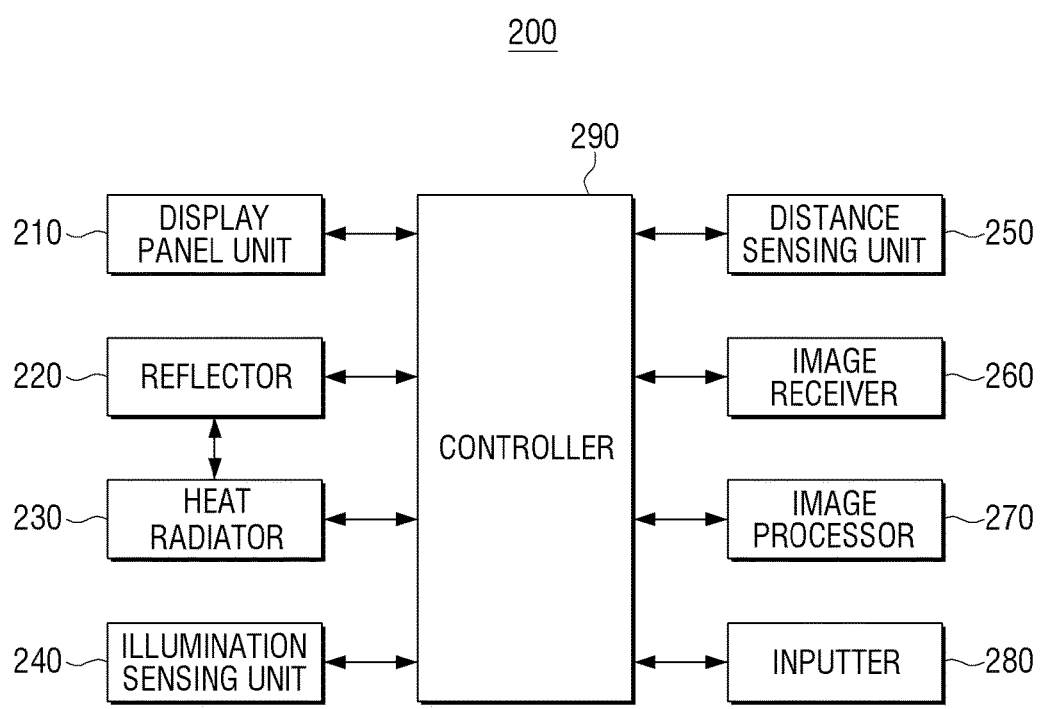
FIG. 2 is a block diagram illustrating additional details of a display apparatus according to an exemplary embodiment.

Hereinafter, an exemplary embodiment will be described in greater detail with reference to FIGS. 2 through 8B. FIG. 2 is a block diagram illustrating additional details of a display apparatus 200 according to an exemplary embodiment. As illustrated in FIG. 2, the display apparatus 200 includes a display panel unit 210, a reflector 220, a heat radiator 230, an illumination sensing unit 240, a distance sensing unit 250, an image receiver 260, an image processor 270, an inputter 280, and a controller 290.

FIG. 2 illustrates various elements of an exemplary display apparatus 200 equipped with various functions such as a display function, a heat radiate function and the like. According to an exemplary embodiment, one or more of the elements illustrated in FIG. 2 may be deleted or changed, and another element may be added, as would be understood by one of skill in the art based on the descriptions provided herein.

The display panel unit 210 outputs image based on image data received by the image receiver 260. Herein, the display panel unit 210 may be a liquid crystal display (LCD); however, this is only one exemplary embodiment, and the display panel unit 210 may be any of various displays such as a cathode ray tube (CRT), a plasma display panel (PDP), an organic light emitting diodes (OLED), and the like.

The reflector 220 is disposed on the display panel unit 210 and a color of the reflector 220 changes according to temperate. The reflector 220 reflects light incident thereon from outside of the display apparatus 200. The reflector 220 may reflect light incident from the outside of the display apparatus 200 using a temperature indicating paint that has a color that changes according to temperature. Temperature indicating paint is one type of temperature discoloration paint, and is a special paint which changes from colorlessness to colored or from colored to another color when its temperature exceeds a predetermined temperature. The range of the color change temperature is different based on the conditions of production of the paint, but typically, the range of the color change temperature may be from about −15° C. to about 70° C., and the concentration of the color in the paint may vary according to the specific pigment mixture used. For example, the temperature indicating paint may be initially transparent, and may change to white at a temperature of 60° C. The reflector 220 may have a predetermined pattern, and the temperature indicating paint may be applied to the reflector, according to the pattern, to face a direction from which light is incident.

The heat radiator 230 is positioned on the reflector 220, and generates heat to change the temperature of the reflector 220. Specifically, the heat radiator 230 may generate heat to heat at least one area of the reflector 220. Herein, the heat radiator 230 may include an indium tin oxide (ITO) or graphene in order to prevent the heat radiator from blocking a view of an image output by the display panel unit 210.

Figure 3A:
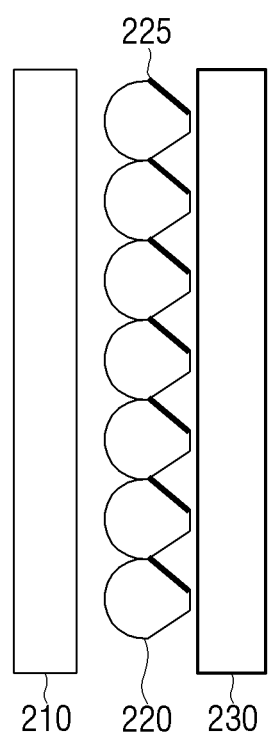
FIGS. 3A to 3B illustrate a display panel unit, a reflector, and a heat radiator according to an exemplary embodiment.
Figure 3B:
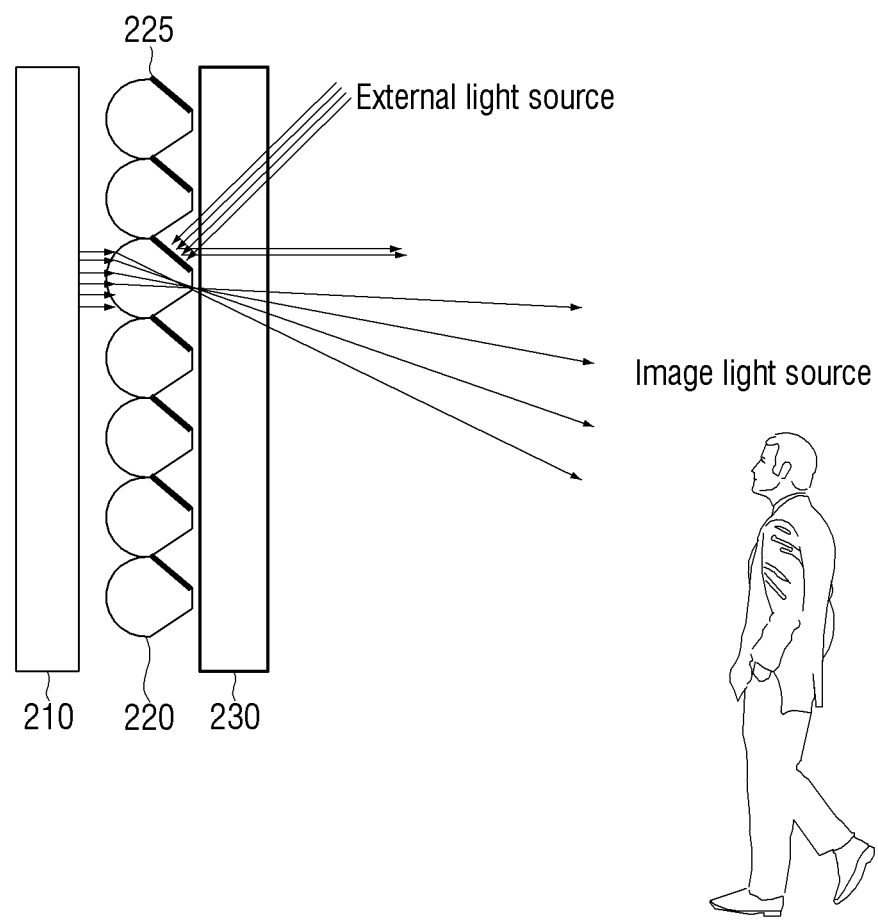

FIGS. 3A and 3B illustrate the display panel unit 210, the reflector 220 and the heat radiator 230 according to an exemplary embodiment.

As illustrated in FIG. 3A, the reflector 220, patterned in a specific shape, is positioned on the display panel unit 210, and the heat radiator 230, operable to change a temperature of the reflector 220, is positioned on the reflector 220. In this example, the reflector 220 has the shape of a plurality of semicircles on a side facing the display panel unit 210, and has the shape of a plurality of trapezoids (or truncated pyramids) on a side facing the heat radiator 230. The temperature indicating paint 225 may be applied to a long side of each of the trapezoidal shapes, the long side on which the temperature indicating paint 225 is disposed facing a direction from which external light will most likely be incident on the reflector 220. Accordingly, the temperature indicating paint 225 may reflect light incident from an upper side, as shown in FIG. 3B. In other words, when a viewing angle is from below the display apparatus 200, a long, lower side of each of the trapezoidal shapes may be transparent so that the view of a viewer is not blocked.

FIG. 3B illustrates a light path of an image light source and an external light source output through the display panel unit 210. In the case of the image light source, light is focused through the pattern of semicircles of the reflector 220, and then is transmitted out of the display apparatus 200, to a viewer. In the case of the external light source, light from the external light source is reflected by the temperature indicating paint, disposed on a side of each of the trapezoidal shapes of the reflector 220, and is thereby directed away from a viewer. Accordingly, the display device 200 may prevent the blackening phenomenon whereby an image is degraded due to light from an external light source.

The illumination sensing unit 240 senses an illumination value of light incident on the display apparatus 200 from an external source. The illumination sensing unit 240 may include a plurality of illumination sensors, and the plurality of illumination sensors may be positioned in a plurality of areas of the display panel unit 210.

The distance sensing unit 250 measures a distance between the display apparatus 200 and a viewer. The distance sensing unit 250 may measure a distance between the display apparatus 200 and a viewer using a camera, infrared light, or the like, as would be understood by one of skill in the art.

The image receiver 260 receives image data from any of various sources. For example, the image receiver 260 may receive broadcasting image data from an external broadcasting company, and may also receive image data from an external apparatus, such as a DVD (digital video disc) player, for example.

The image processor 270 processes the image data received from the image receiver 260. The image processor 270 may perform any one or more of various image processes such as decoding, scaling, noise filtering, frame rate conversion, resolution conversion, and on the like, as would be understood by one of skill in the art.

The inputter 280 may receive an input from a user and input the user instruction to the controller 290, to control the display apparatus 200. The inputter 280 may receive an input a user instruction including information regarding an installation height of the display apparatus 200. More particularly, the inputter 280 may be as a touch panel for receiving a touch input from a user, but this is merely exemplary, and the inputter 280 may alternately be any one or more of a remote controller, a pointing device, a motion recognition device, a mouse, and the like, as would be understood by one of skill in the art.

The controller 290 controls the overall operation of the display apparatus 200 according to user instructions received through the inputter 280, or according to information received from one or more other units of the display apparatus 200. For example, the controller 290 may control the heat radiator 230 to radiate heat to control the temperature of the reflector 220 according to an illumination value sensed by the illumination sensing unit 240.

For example, if an illumination value sensed by the illumination sensing unit 240 is equal to or higher than a predetermined value, the controller 290 may control the heat radiator 230 to generate heat in order to change the color of temperature indicating paint of the reflector 220 so that the reflector 220 reflects light incident thereon from an external source. For example, if an illumination value sensed through the illumination sensing unit 240 is equal to or higher than 50,000 lux, the controller 290 may control the heat radiator 230 to generate heat by controlling current to flow through a heater film of the heat radiator 230.

Figure 4:
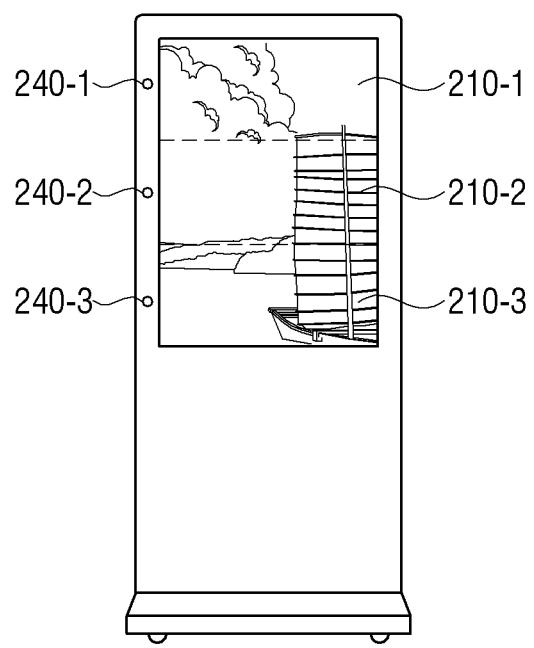
FIG. 4 illustrates a display apparatus equipped with a plurality of illumination sensors according to an exemplary embodiment.

The illumination sensing unit 240 may include a plurality of illumination sensors, and a plurality of illumination sensors may be positioned in areas corresponding to the display panel unit 210. As shown in FIG. 4, a first illumination sensor 240-1 may be positioned adjacent to an upper area 210-1 of the display panel unit, a second illumination sensor 240-2 may be positioned adjacent to a middle area 210-2 of the display panel unit, and a third illumination sensor 240-3 may be positioned adjacent to a bottom area 210-3 of the display panel unit.

Each of a plurality of illumination sensors 240-1 to 240-3 is configured to sense an illumination value of light incident thereon from an external light source. The controller 290 may control the heat radiator 230 to change a temperature of regions of the reflector 220, corresponding to the plurality of areas 210-1 to 210-3 of the display panel unit, using the illumination values sensed by the plurality of sensors 240-1 to 240-3.

Figure 5:
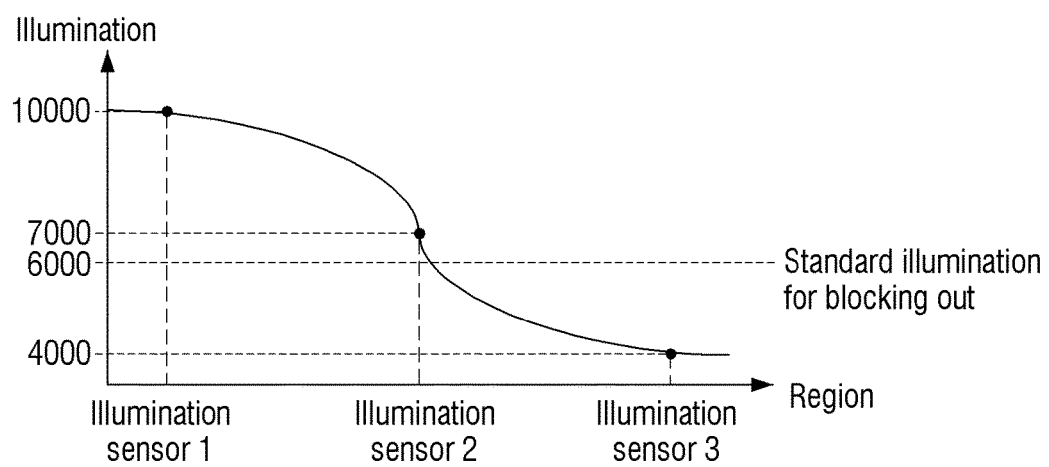
FIG. 5 is a graph illustrating an illumination value measured by a plurality of illumination sensors according to an exemplary embodiment.

For example, as illustrated in FIG. 5, if an illumination value sensed by the first illumination sensor 240-1 is 10,000 lux, an illumination value sensed by the second illumination sensor 240-2 is 7,000 lux, and an illumination value sensed by the third illumination sensor 240-3 is 4,000 lux, the controller 290 may determine that the external light incident on the upper 210-1 and middle 210-2 areas is larger than a predetermined value, e.g. a standard illumination for blocking out, for example, 6,000 lux.

Figure 6:
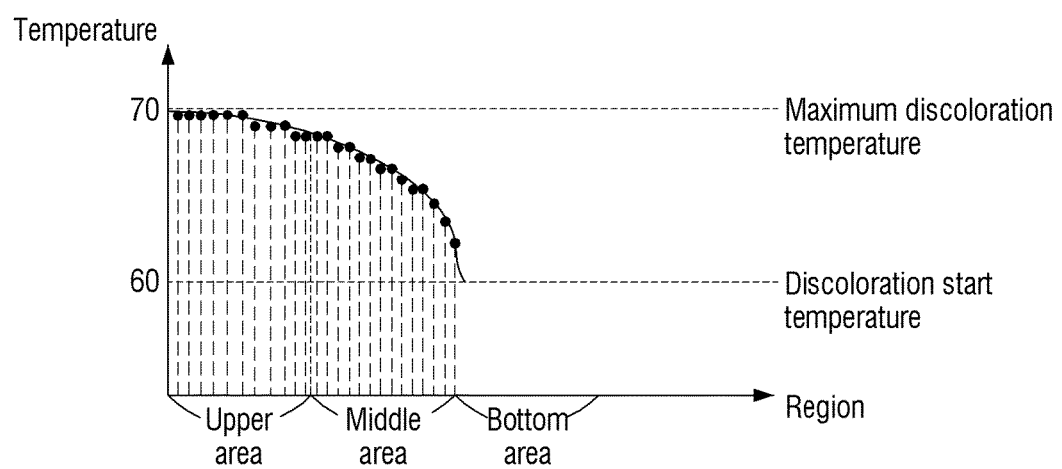
FIG. 6 is a graph illustrating a relationship between a temperature and a discoloration of a reflector according to an exemplary embodiment.

The controller 290 may then control the heat radiator 230 to increase the temperature of the portions of the reflector 220 disposed in areas corresponding to the upper area 210-1 and the middle area 210-2 so that the external light incident on the upper area 210-1 and the middle area 210-2 is reflected. The controller 290 may control the heat radiator 230 so that the temperature of the portions of the reflector 220 disposed in areas corresponding to the upper area 210-1 and the middle area 210-2 are equal to or higher than 60 degrees, which is a discoloration point. In particular, as illustrated in FIG. 6, the controller 290 may control the heat radiator 230 so that the temperature of the portion of the reflector 220 corresponding to the upper area 210-1, where an illumination value is large, is higher than the temperature of the portion of the reflector 220 corresponding to the middle area 210-2. However, this is merely exemplary, and the temperature of the portions of the reflector 220 in areas corresponding to both the upper area 210-1 and the middle area 210-2 may be identical.

In this way, the temperature of the temperature indicating paint disposed in portions of the reflector 220 corresponding to the upper area 210-1 and the middle area 210-2 becomes equal to or higher than a discoloration point, and thus, a user can easily view an image displayed on the upper area 210-1 and the middle area 210-2 of the display panel unit due to the reflection of the external light in the upper area 210-1 and the middle area 210-2 of the display panel unit.

The controller 290 may determine an installation height of the display apparatus 200, and control the heat radiator to generate heat in only one portion of the display panel unit 210 according to the determined installation height. Specifically, if a user is viewing an image displayed on the display apparatus 200 from a viewing angle lower than an angle (θ) of a side of the reflector 260 on which the temperature indicating paint is applied, the external light may be reflected incorrectly by the temperature indicating paint, so that the reflected external light may interfere with the user's view of the image. Accordingly, the controller 290 may control the heat radiator 230 to increase the temperature of only that portion of the reflector 220 which is higher than a specific height (an area for which the user's viewing angle (θ) is larger than the angle of the side of the reflector 260 on which the temperature indicating paint is applied), so that only external light incident on an upper part of the display panel unit 210 is reflected.

Figure 7:
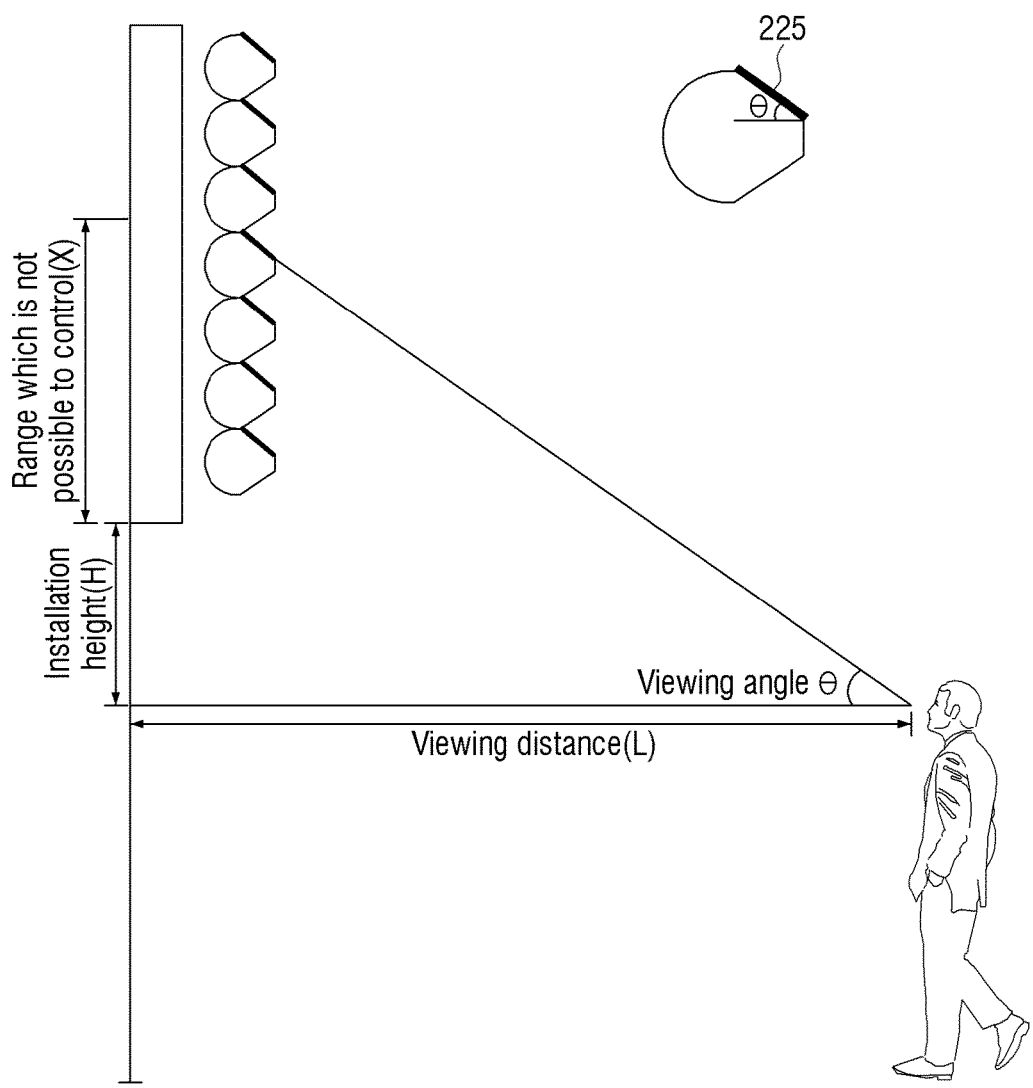
FIG. 7 illustrates the generation of heat in only a portion of a display area according to an installation height of a display apparatus according to an exemplary embodiment.

More specifically, as illustrated in FIG. 7, if an average viewing distance (L) between the display apparatus 200 and a viewer, and an installation height (H) when a display is installed (that is, a height where the display apparatus is installed from an eye level of a user) are known, the controller 290 may calculate a range (x), within which it is not possible to control the reflection of external light using Equation 1 below. In other words, the controller 290 may use Equation 1 to determine the range (x) of the display apparatus 200, for which the reflection of external light should not be controlled using the temperature indicating paint. The controller 290 can then control the temperature of the portions of the reflector 220 other than those portions within the range (x).

$$x = (L * \tan \theta) - H \quad \text{[Equation 1]}$$

As described above, by determining an area of the display apparatus 200, for which the temperature should be changed according to the installation height (H) of the display, the portions of the reflector 220 positioned in an area for which the user's viewing angle is smaller than an angle of the side of the reflector on which the temperature indicating paint is applied, are not heated, so that the disruption of the view of a user who is watching an image is minimized.

In this way, the controller 290 may control the heat radiator 230 to generate heat only in a partial area of the display panel unit 210 according to the distance between the display apparatus 200 and the viewer, as sensed by the distance sensing unit 250, and the installation height of the display apparatus 200.

Figure 8A:
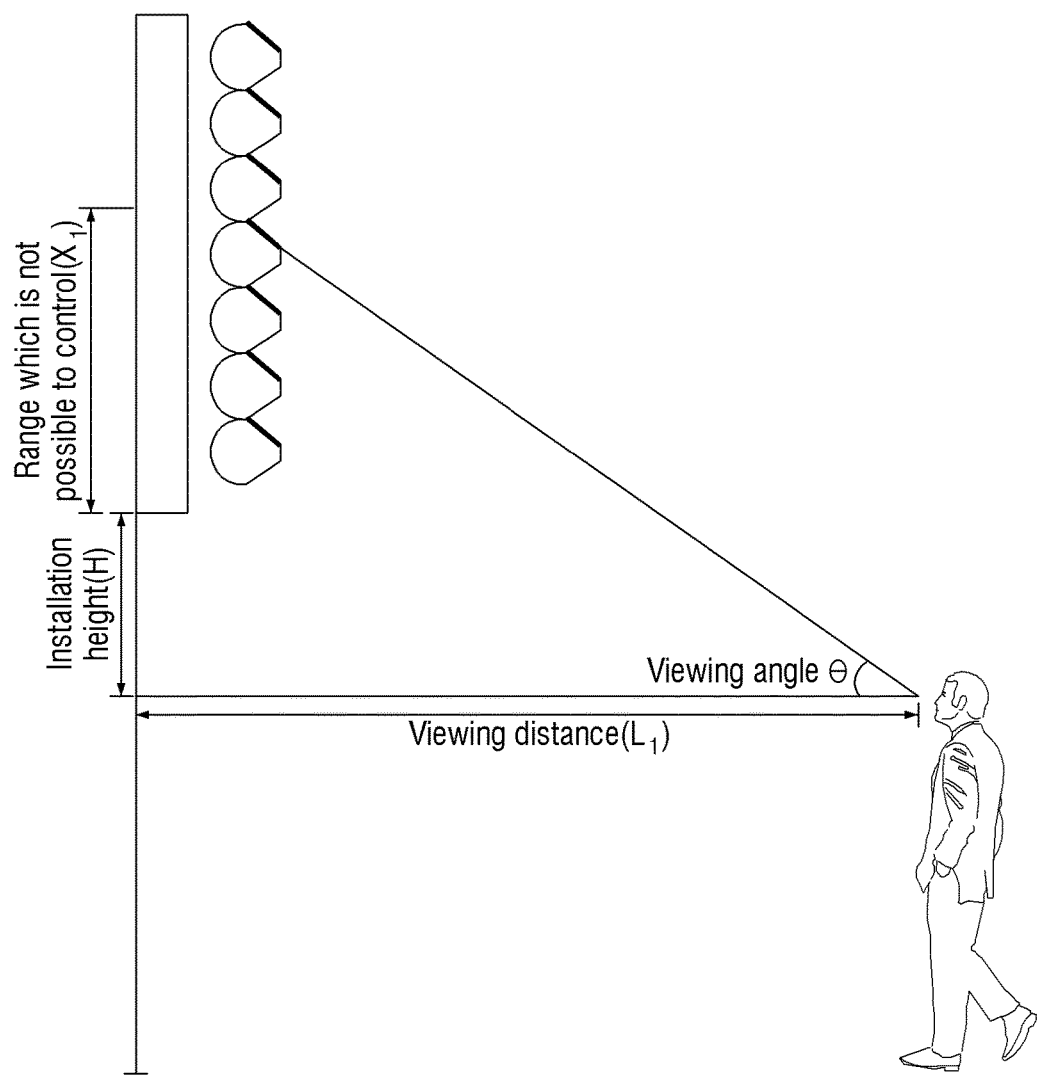
FIGS. 8A to 8B illustrate the generation of heat in only a portion of a display area according to an installation height of a display apparatus and a distance between a display apparatus and a viewer, according to an exemplary embodiment.

More specifically, as illustrated in FIG. 8A, if a viewing distance ($L_1$) between the display apparatus 200 and a viewer is sensed by the distance sensing unit 250 and the installation height (H) when a display is installed are known, the controller 290 may calculate a range ($x_1$), within which it is not possible to control the reflection of external light, using Equation 2 below. The controller 290 can then control a temperature of the portions of the reflector 220 other than those portions within the range ($x_1$).

$$x_1 = (L_1 * \tan \theta) - H \qquad \text{[Equation 2]}$$

Figure 8B:
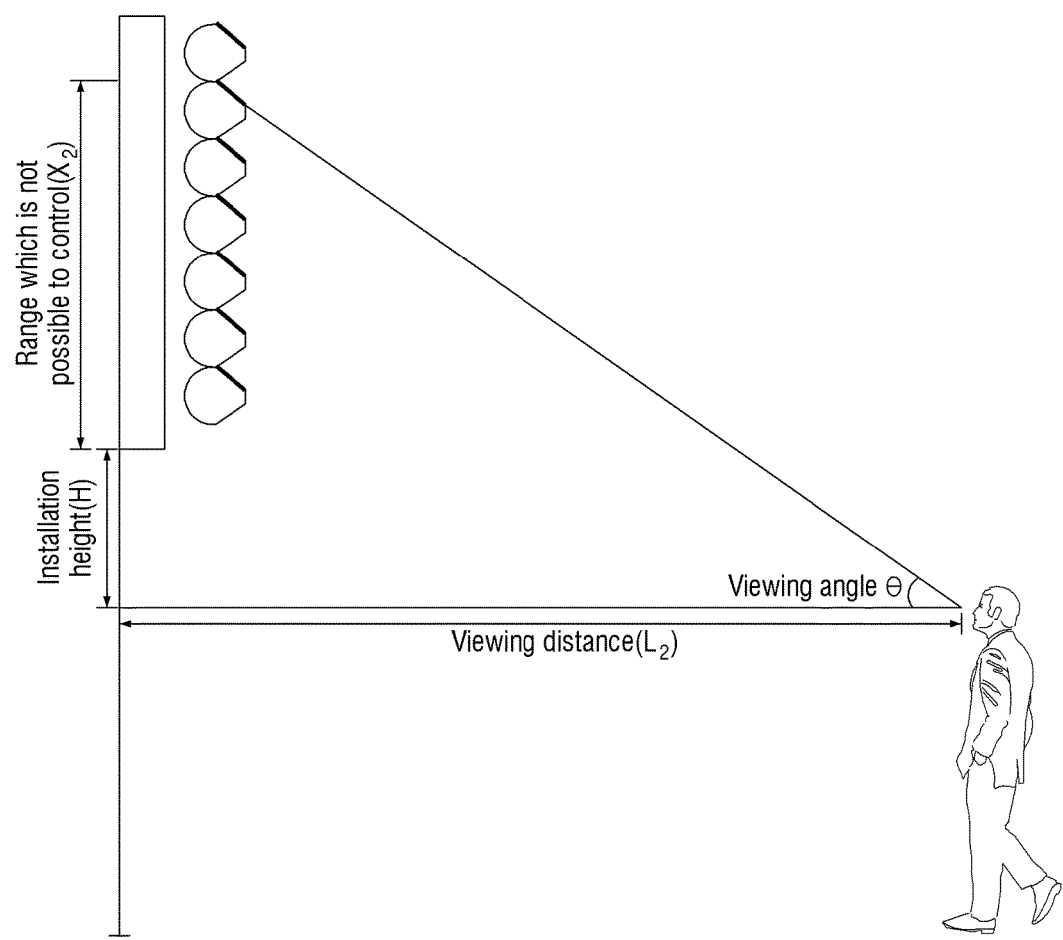

As illustrated in FIG. 8B, if the viewing distance ($L_2$) between the display apparatus 200 and a user is sensed by the distance sending unit 250, and the installation height (H) when a display is installed is known, the controller 290 may calculate a range ($x_2$) within which it is not possible to control the reflection of external light, using Equation 3 below. The controller 290 can then control the temperature of those portions of the reflector 220 other than those portions within the range ($x_2$).

$$x_2 = (L_2 * \tan \theta) - H \qquad \text{[Equation 3]}$$

As illustrated in FIGS. 8A and 8B, as a viewer comes approaches the display apparatus 200, the range (x), within which it is not possible to control the reflection of external light, is decreased. Conversely, as the viewer moves away from the display apparatus 200, the range (x), within which it is not possible to control the reflection of external light, is increased. In other words, as the user approaches the display apparatus 200, external light may be reflected from lower portions of the display apparatus 200.

Figure 10A:
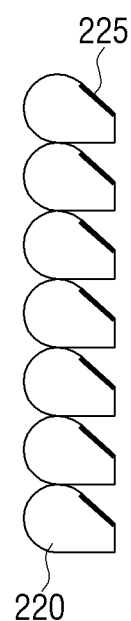
FIGS. 10A to 10B illustrate various exemplary shapes of a reflector.
Figure 10B:
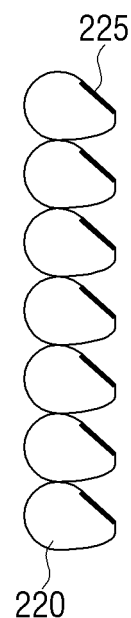

The aforementioned exemplary embodiments describe that the side of the reflector 220 facing away from the display panel unit 210 has the shape of a plurality of trapezoids. However, this is only one example, and the reflector 220, alternately, may have any of a variety of other shapes, as would be understood by one of skill in the art. For example, the side the reflector 220 facing away from the display panel unit 210 may be shaped as shown in either of FIGS. 10A and 10B. In these examples as well, the temperature indicating paint 225 may be applied to portions of the reflector 220 which face a direction from which external light is incident.

Figure 11:
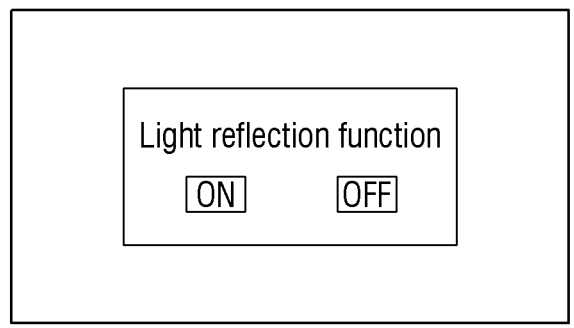
FIG. 11 illustrates a user interface (UI) for controlling a light reflection function, according to an exemplary embodiment.

A user may turn on or off a light reflection function of the display apparatus using a separate menu or user interface (UI). For example, as illustrated in FIG. 11, if a user instruction for turning on the light reflection function is received by the inputter 280 while a UI for controlling the light reflection function is being displayed, the controller 290 can turn on the light reflection function, and cause the external light to be reflected, as illustrated in FIGS. 3A to 8B. Also, as illustrated in FIG. 11, if a user instruction to turn off the light reflection function is received by the inputter 280 while a UI for controlling the light reflection function is being displayed, the controller 290 can turn off the light refection function.

Figure 9:
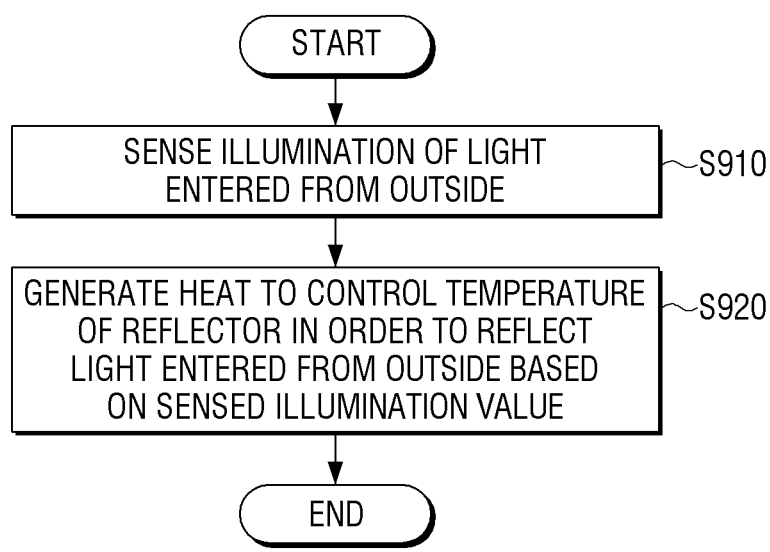
FIG. 9 is a flowchart of a method for controlling a display apparatus according to an exemplary embodiment.

Hereinafter, a method for controlling a display apparatus will be explained more specifically with reference to FIG. 9. The display apparatus 200 according to this exemplary embodiment includes a display panel unit 210, a reflector 220 which is disposed on the display panel unit 210 and a heat generator 230 which is disposed on the reflector 220. A color of the reflector changes according to a temperature thereof and enables the reflector to reflect light incident thereon from outside the display apparatus 200. The generator 230 generates heat to control the temperature of the reflector 220.

The display apparatus 200 senses an illumination of light incident thereon from outside the display apparatus 200 (S910). The display apparatus 200 may sense an illumination value of external light incident on only a partial region of the display apparatus 200, but this is merely exemplary. Alternately, an illumination value of a plurality of areas of the display apparatus 200 may be sensed.

The display apparatus 200 may generate heat to control a temperature of the reflector 220, to thereby control the reflector 220 to reflect light incident thereon from outside the display apparatus 200, based on the sensed illumination value (S920). More specifically, if the sensed illumination value is equal to or higher than a predetermined value, the display apparatus 200 may generate heat to change the color of temperature indicating paint disposed on the reflector 220 so that external light is reflected from a portion of the display apparatus 200 where the illumination value is higher.

Accordingly, a user may more easily view an image displayed on the display apparatus regardless of light from an external source.

An apparatus according to one or more of the exemplary embodiments may include a processor, a memory that stores and executes program data, a permanent storage such as a disk drive, a communication port that communicates with an external apparatus, and a user interface apparatus such as one or more of a touch panel, a key, and a button. Methods that may be implemented by a software module or an algorithm are codes or program commands that are executable on the processor and readable by a computer, and may be stored on a recording medium readable by a computer. A recording medium readable by a computer may include one or more of a magnetic storage medium (for example, a read-only memory, a random-access memory, a floppy disk, a hard disk, etc.) and an optical readable medium (for example, a compact disk read-only memory (CD-ROM), a digital versatile disk (DVD), etc.). A recording medium readable by a computer may be distributed among computer systems that are connected over a network so that a code readable by a computer may be stored and executed in a dispersed fashion. The medium may be readable by a computer, be stored in a memory, and be executed by a processor.

One or more exemplary embodiments may be represented by functional block components and diverse processing steps. Each of the functional blocks may be implemented by one or more pieces of hardware and/or software components that execute specific functions. For example, an exemplary embodiment may employ direct circuit components, such as a memory, processing, logic, and a look-up table, that execute diverse functions by control of one or more microprocessors or other control apparatuses. Components that are executed as software programming or software elements may be written in a programming or scripting language such as C, C++, Java, and using an assembler, including diverse algorithms that are implemented with data structure, processes, routines, or combination of other programming components. The functional factors may be implemented by an algorithm executed by one or more processors. In addition, exemplary embodiments may employ the related art for electronic configuration, signal processing, and/or data processing. The terms "mechanism", "element", "means", and "component" may be used in a broad sense, and is not limited to mechanical or physical components. The terms may include a set of routines of software that are connected with a processor.

The foregoing embodiments and advantages are merely exemplary and are not to be construed as limiting. For simplicity of the specification, electronic components, control systems, software, and other functional factors in the related art may be omitted. In addition, connection of lines or connection members between the components in the drawings illustrate functional connection and/or physical or circuital connection as example, and thus in a real apparatus, replaceable or additional diverse functional connection, physical connection or circuital connection may be provided.

In this specification and in the claims, the use of the term "the" and similar referential terms may refer to both the singular and the plural. In addition, when a range is written, individual values within the range are included (if there is no contrary mention). Accordingly, it is the same as the individual values that compose the range are written in the detailed description. Finally, the steps that compose the method may be performed in appropriate order if the order is not obviously written or if there is no contrary mention. The present invention is not always limited to the order in which the steps are written. The foregoing exemplary embodiments and advantages are merely exemplary and are not to be construed as limiting the present invention. Also, the description of exemplary embodiments herein is intended to be illustrative, and not to limit the scope of the claims, and many alternatives, modifications, and variations will be apparent to those skilled in the art.

What is claimed is:

1. A display apparatus, comprising:
   a display panel;
   a reflector, disposed on the display panel, wherein a color of a first side of the reflector is changeable based on a temperature of the first side of the reflector, and wherein the first side of the reflector is configured to reflect light incident thereon from outside the display apparatus;
   a heat radiator disposed on the reflector;
   a sensor; and
   a controller configured to:
      control the sensor to sense an illumination value of the light incident thereon from outside the display apparatus, and
      control the heat radiator to generate the heat, based on the illumination value sensed being equal to or higher than a predetermined value, to change the temperature of the first side of the reflector based on the generated heat, and thereby change the color of the first side of the reflector according to the temperature,
   wherein the sensor further comprises a plurality of sensors configured to sense the light incident thereon from outside the display apparatus, and
   wherein the plurality of sensors are respectively disposed on a plurality of areas of the display apparatus.

2. The display apparatus as claimed in claim 1, wherein the reflector comprises temperature indicating paint disposed on the first side of the reflector, wherein a color of the temperature indicating paint is changeable according to a temperature of the temperature indicating paint.

3. The display apparatus as claimed in claim 2, wherein the first side of the reflector faces a direction from which light is incident on the display apparatus from outside the display apparatus.

4. The display apparatus as claimed in claim 2, wherein, based on the illumination value sensed by the sensor being equal to or higher than the predetermined value, the controller is configured to control the heat radiator to generate the heat, thereby heating the temperature indicating paint and changing the color of the temperature indicating paint.

5. The display apparatus as claimed in claim 1, wherein the controller is configured to control the heat radiator to generate the heat selectively in only one of the plurality of areas of the display apparatus in which an illumination value is equal to or higher than the predetermined value.

6. The display apparatus as claimed in claim 1, wherein the controller is configured to control the heat radiator to generate the heat selectively in only one of a plurality of areas of the display apparatus according to an installation height of the display apparatus.

7. The display apparatus as claimed in claim 6, further comprising:
   another sensor configured to measure a distance between the display apparatus and a viewer,
   wherein the controller controls the heat radiator to generate heat selectively only in one of a plurality of more of the display apparatus according to the distance between the display apparatus and the viewer and the installation height of the display apparatus.

8. The display apparatus as claimed in claim 1, wherein the heat radiator comprises includes at least one of transparent indium tin oxide (ITO) and a graphene heater film.

9. A display apparatus comprising:
   a display panel;
   a reflector disposed on the display panel, the reflector comprising a first side facing a direction from which light is incident on the display apparatus from outside the display apparatus, wherein a reflectivity of the first side of the reflector is changeable according to a temperature of the first side of the reflector;
   a heat radiator configured to heat the reflector;
   a sensor; and
   a controller configured to:
      control the sensor to sense an illumination value of the light incident on the display apparatus from outside the display apparatus,
      control the heat radiator to generate the heat, based on the illumination value sensed being equal to or higher than a predetermined value, to change the temperature of the first side of the reflector based on the generated heat,
   wherein the sensor comprises a plurality of sensors configured to sense the light incident on the display apparatus from outside the display apparatus, and
   wherein the plurality of sensors are respectively disposed in each of a plurality of areas of the display apparatus.

10. The display apparatus as claimed in claim 9, wherein the reflector comprises a temperature indicating paint disposed on the first side of the reflector, wherein a color of the temperature indicating paint is changeable according to the temperature of the temperature indicating paint.

11. The display apparatus as claimed in claim 9, wherein:
    the heat radiator is configured to independently heat the reflector in each of the plurality of areas of the display apparatus; and
    the controller controls the heat radiator to independently change a temperature of the first side of the reflector in each of the plurality of areas of the display apparatus according to an illumination value obtained by the sensor disposed in each of the plurality of areas.

12. The display apparatus as claimed in claim 9, wherein:
    the heat radiator is configured to independently heat the reflector in each of the plurality of areas of the display apparatus; and
    the controller controls the heat radiator to independently change a temperature of the first side of the reflector in each of the plurality of areas of the display apparatus according to the illumination value and an installation height of the display apparatus.

13. The display apparatus as claimed in claim 9, wherein:
the heat radiator is configured to independently heat the reflector in each of the plurality of areas of the display apparatus; and
the controller controls the heat radiator to independently change a temperature of the first side of the reflector in each of the plurality of areas of the display apparatus according to the illumination value, an installation height of the display apparatus, and a distance between the display apparatus and a viewer.

14. A method of controlling a display apparatus, the method comprising:
sensing an illumination value of light incident on the display apparatus from outside the display apparatus; and
generating heat, based on the illumination value sensed being equal to or higher than a predetermined value, to change a temperature of a reflector, disposed on a display panel of the display apparatus, based on the generated heat,
wherein the reflector is disposed on the display panel and comprises a first side facing a direction from which light is incident on the display apparatus from outside the display apparatus, wherein a reflectivity of the first side of the reflector is changeable according to a temperature of the first side of the reflector,
wherein the display apparatus comprises a plurality of areas and a plurality of sensors configured to sense the light incident on the display apparatus from outside the display apparatus, and
wherein the plurality of sensors are respectively disposed in each of the plurality of areas of the display apparatus.

15. The method as claimed in claim 14, wherein the changing the temperature of the reflector comprises changing a temperature of a temperature indicating paint disposed on the first side of the reflector, thereby changing a color of the temperature indicating paint.

16. The method as claimed in claim 15, wherein:
the sensing the illumination value comprises independently sensing an illumination value in each of the plurality of areas of the display apparatus; and
the changing the temperature of the reflector comprises independently changing a temperature of the first side of the reflector in each of the plurality of areas of the display apparatus according to the illumination value sensed in each of the plurality of areas of the display apparatus.

17. The method as claimed in claim 15, wherein:
the changing the temperature of the reflector comprises independently changing a temperature of the first side of the reflector in each of the plurality of areas of the display apparatus according to the illumination value and an installation height of the display apparatus.

18. The method as claimed in claim 15, wherein:
the changing the temperature of the reflector comprises independently changing a temperature of the first side of the reflector in each of the plurality of areas of the display apparatus according to the illumination value, an installation height of the display apparatus, and a distance between the display apparatus and a viewer.

\* \* \* \* \*